United States Patent [19]
Park

[11] Patent Number: 5,151,787
[45] Date of Patent: Sep. 29, 1992

[54] METHOD AND CIRCUIT FOR CORRECTING IMAGE EDGE

[75] Inventor: Young-Jun Park, Suwon, Rep. of Korea

[73] Assignee: SamSung Electronics Co., Ltd., Suweon, Rep. of Korea

[21] Appl. No.: 632,074

[22] Filed: Dec. 21, 1990

[30] Foreign Application Priority Data

Dec. 23, 1989 [KR] Rep. of Korea ............... 1989-19443

[51] Int. Cl.⁵ ............................................. H04N 5/208
[52] U.S. Cl. ..................................... 358/162; 382/22; 358/166; 307/263
[58] Field of Search .................. 382/22; 358/162, 166, 358/37, 96; 307/263, 362; 328/114

[56] References Cited

U.S. PATENT DOCUMENTS

4,553,042 11/1985 Batterman ........................... 307/263
4,918,528 4/1990 Oohashi ............................... 358/162
5,050,223 9/1991 Sumi ..................................... 358/166

Primary Examiner—Leo H. Boudreau
Assistant Examiner—Steven P. Klocinski
Attorney, Agent, or Firm—Robert E. Bushnell

[57] ABSTRACT

An edge correction circuit and method for enhancing image definition by reducing a conversion time at an region of a luminance signal in a digital image processor, said method including the steps of and the circuitry for: (a) generating a first control signal by detecting a pixel where a image luminance signal starts to change; (b) converting and outputting a pixel level state which is the same as the state before conversion of an edge region while said first control signal is being generated; (c) generating a second control signal by detecting a pixel prior to the luminance signal stabilization; and (d) outputting a pixel level state which is the same as the state after a complete conversion of the edge region which the second control signal generates.

12 Claims, 6 Drawing Sheets

(PRIOR ART)

FIG. 1

(PRIOR ART)

METHOD AND CIRCUIT FOR CORRECTING IMAGE EDGE

BACKGROUND OF THE INVENTION

The present invention relates to an image edge correcting circuit and method for a digital image processor.

Figure 1:
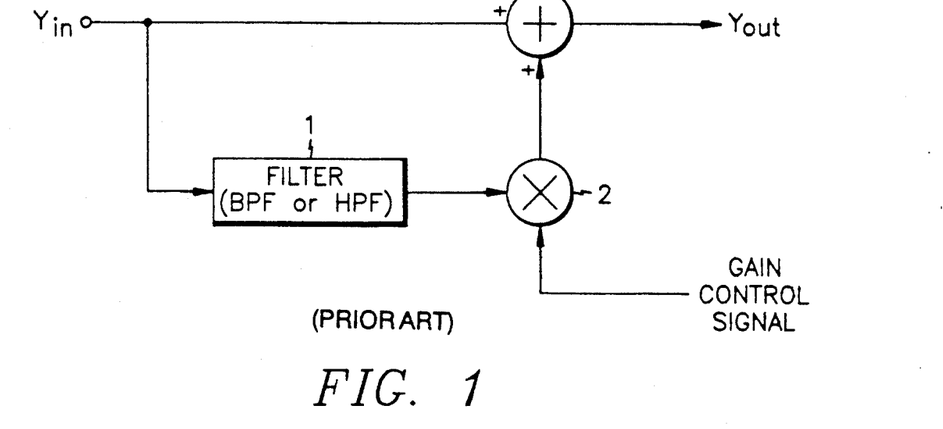
FIG. 1 is a diagram of a first prior art edge-correcting circuit.

A general edge correcting circuit for an image in a television receiver is composed as shown in FIG. 1 and uses a correcting method to sharpen an edge of an image on a CRT which extracts outline components of an image luminance signal "Y" by passing a band pass filter or a high pass filter, mixes the extracted signal with a gain control signal in a multiplier (2), and then adds the image luminance signal "Y" to the mixed signal in an adder (3).

The process is hereinafter described with reference to the waveforms of FIG. 2.

Figure 2:
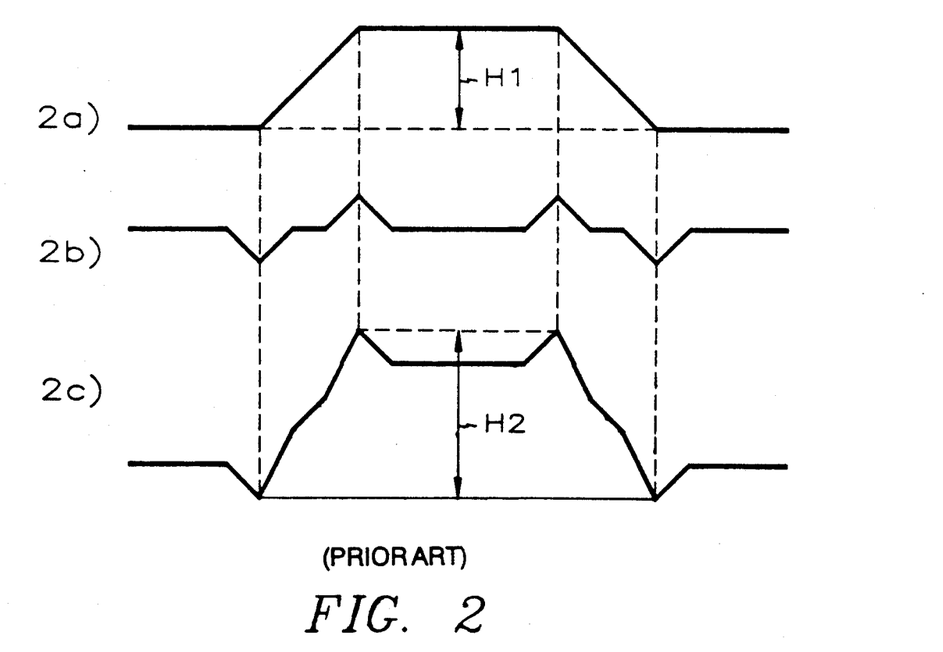
FIG. 2 is a waveform diagram of signals occurring in the FIG. 1 circuit.

When the image luminance signal "Y" is as in "2a" of FIG. 2, the extracted edge of the image luminance signal "Y" through the filter (1) is as in "2b" of FIG. 2. After the edge of the image luminance signal "Y" is extracted, the extracted edge components signal "2b" of the image luminance signal "Y" is mixed with the gain control signal by the multiplier (2), and then added to the image luminance signal "Y" at the adder (3) to output a final edge-corrected signal "2c". If the final edge-corrected signal as in "2c" is scanned on a CRT, a difference of the luminance signal between a dark portion and a bright portion is about "H2" which is more effective than "H1" the result of scanning the image luminance signal "Y" as is shown in "2a". Therefore, the general edge correcting circuit for an image which extracts an edge of an image helps viewers to enjoy a vivid image by increasing the contrast of the edge.

Figure 3:
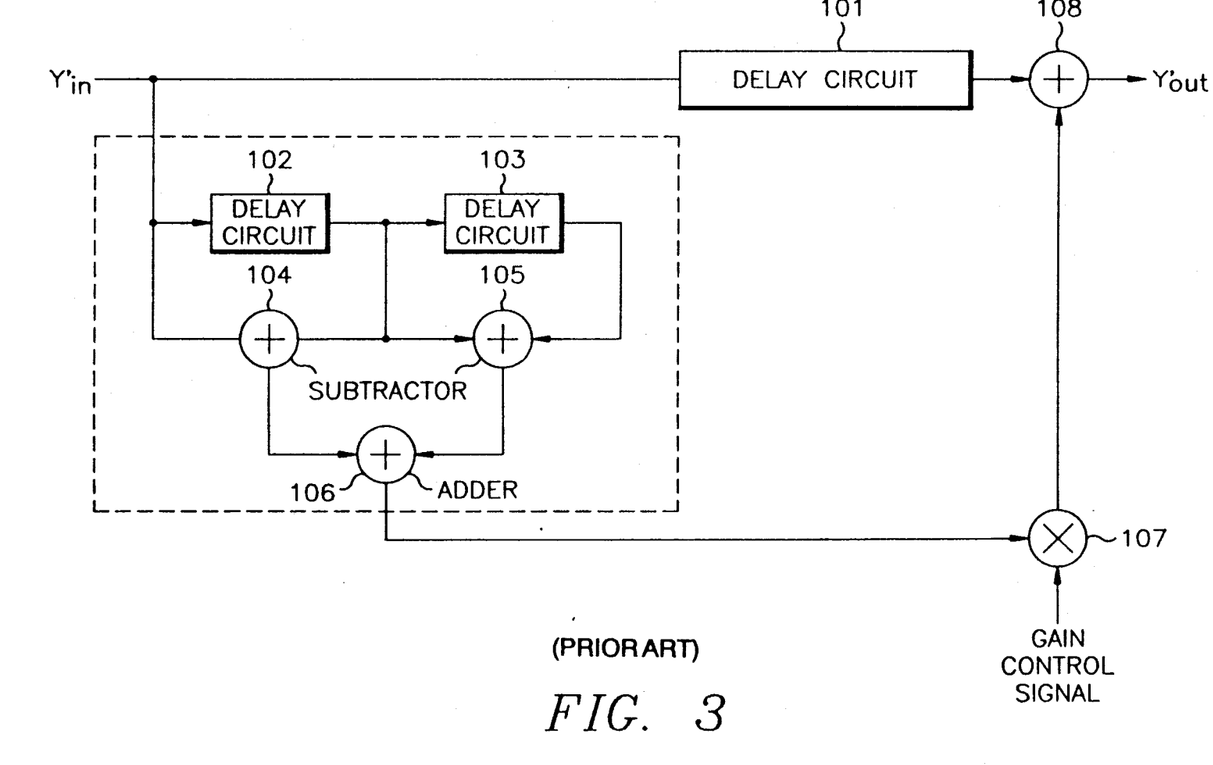
FIG. 3 is a diagram of a second prior art edge-correcting circuit.
Figure 4:
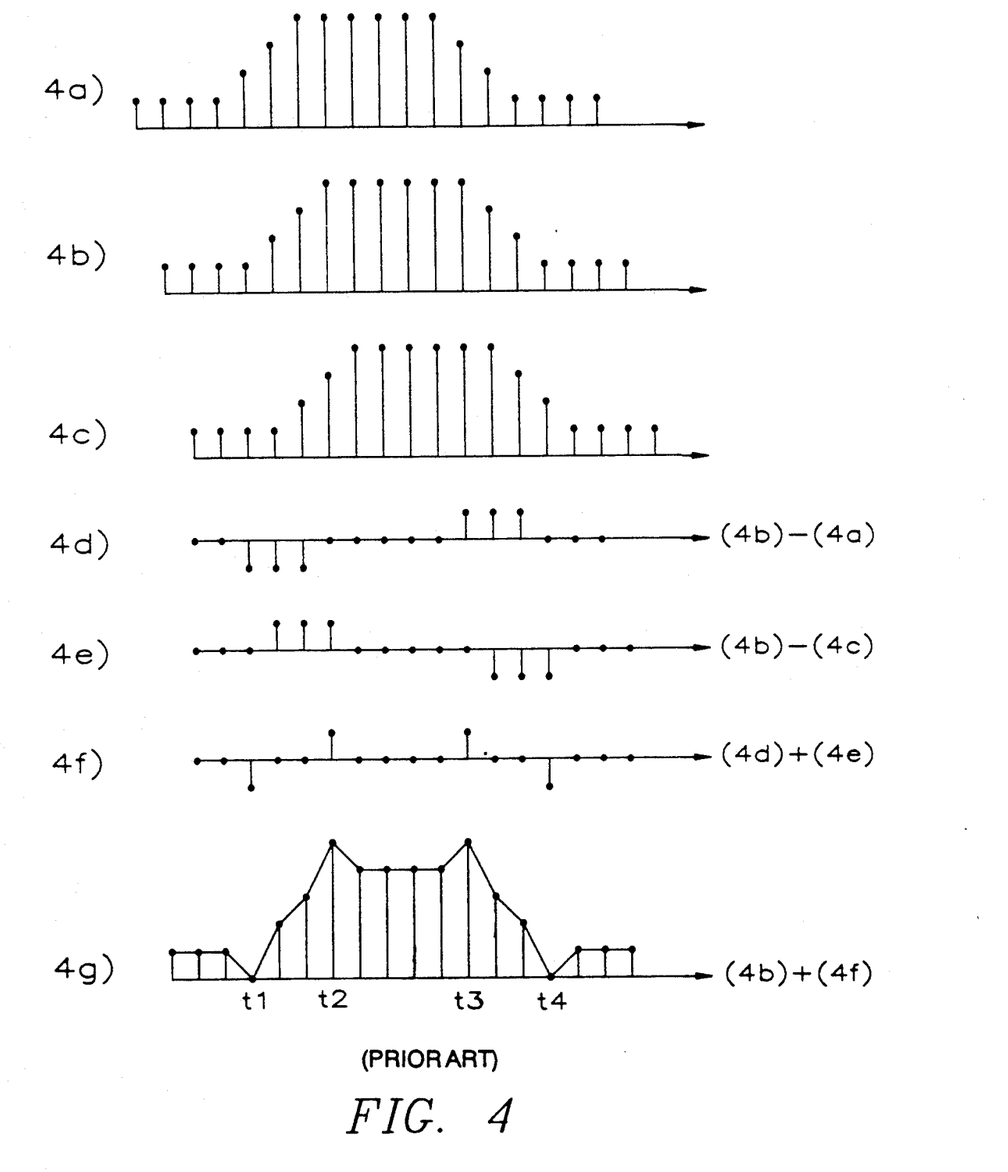
FIG. 4 is a waveform diagram of the signals occurring in the FIG. 3 circuit.

Also, by using a digital differential amplifier as in FIG. 3, the edge correcting circuit for an image stated above can become a digital edge correcting circuit. By sampling and quantizing the analog image luminance signal "Y", the analog image luminance signal Y' becomes a digital image luminance signal Y as is shown in "4a". After the digital image luminance signal Y' of "4a" goes through a first delay circuit (102), the signal is delayed as in "4b", and the digital luminance signal "4b" passed through the first delay circuit (102) becomes as in "4c" after being outputted by a second delay circuit (103). A signal as in "4d" is obtained at a first subtractor "104" by subtracting the digital luminance signal "4a" from the first delayed digital luminance signal "4b", and a signal as in "4e" is obtained at a second subtractor (105) by subtracting the second delayed digital luminance signal "4c" from the first delayed digital luminance signal "4b". A signal "4f" is generated at a first adder (106) by adding the signal "4d" from the first subtractor (104) and the signal "4e" from the second subtractor (105). The signal "4f" from the first adder (106) is mixed with a gain control signal, by means of the multiplier (107), and then added to a signal from a delay circuit (101) at a second adder (108) to generate a edge-corrected digital luminance signal for an image "4g". The edge-corrected digital luminance signal for an image "4g" is converted to an analog signal as shown in the dotted line, by D/A a converter (not shown).

In the first edge-corrected circuit as in FIG. 1 or the second edge-corrected circuit as in FIG. 3, a delay-correction differs according to the constitution of a filter (1) or the first and second subtractors (104) and (105), which determined the frequency band for the edge-corrected circuit. Thus, the conventional method uses the image luminance signal for correcting a edge region. Hence, when the image is displayed on a CRT or a Display Unit, the conventional method sharpens a edge region by increasing a difference of level of a luminance signal at a boundary region, whether the circuit is used in an analog system or digital system.

However, when the stated conventional method is used to correct a edge of a bright boundary region where the signals represent white captions and capitals, an excessive current flows at the edge of a boundary region which results, in turn, in a serious drawback in that a blurring phenomenon results around the boundary region on the CRT display.

SUMMARY OF THE INVENTION

It is therefore an object of the present invention to provide an image edge correction circuit and method that sharpens a edge region by reducing correction time at a level-variation region of the image luminance signal in a digital image processor.

It is another object of the present invention to provide a circuit and a method that generate a sharp edge-corrected signal without depending on a condition of a signal in an image for a digital image processor.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENTS

Turning now more descriptively to the drawings, a detailed explanation of the invention will be given hereinafter.

Figure 5:
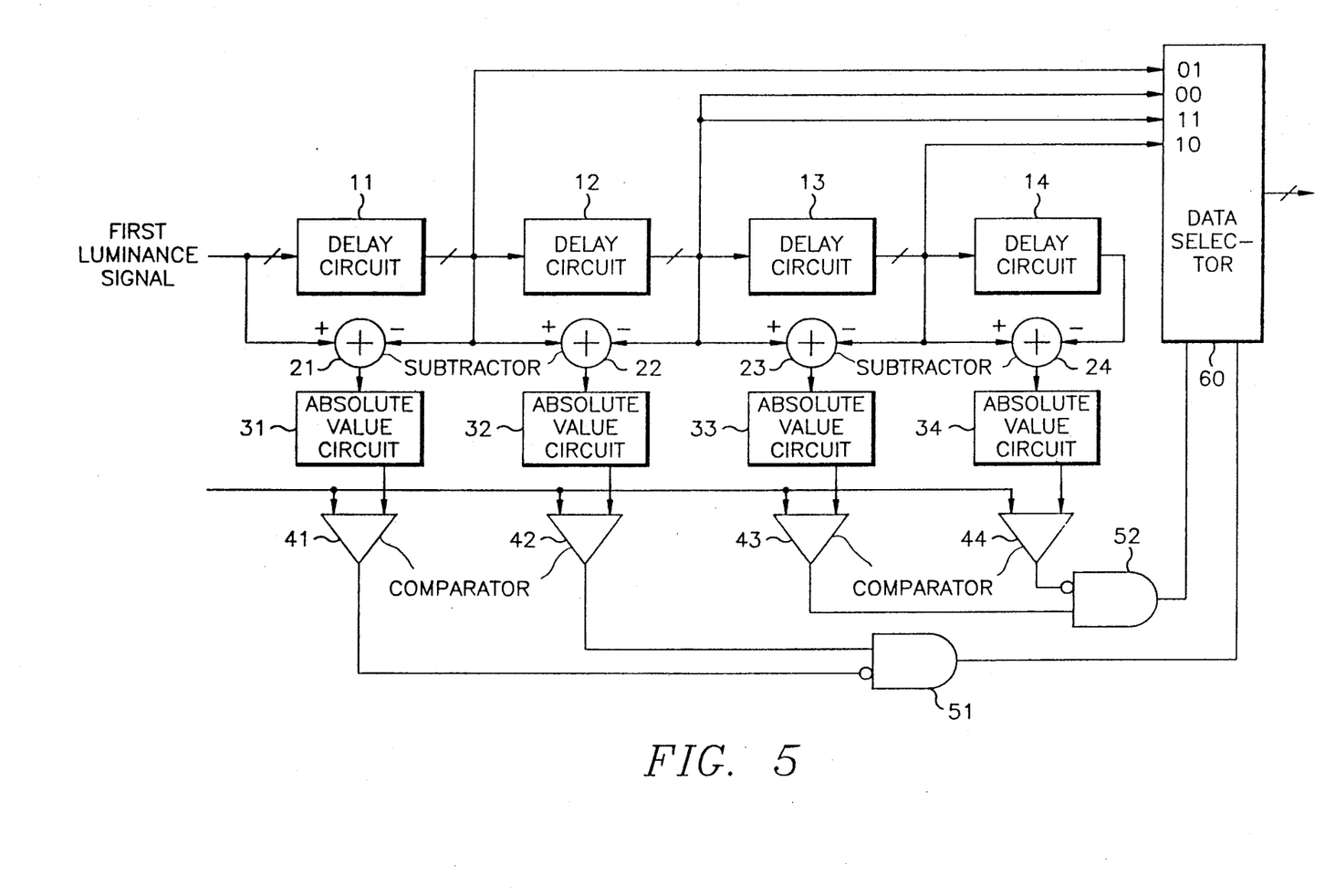
FIG. 5 is a edge correcting circuit according to the present invention.

Referring to FIG. 5, first through fourth delay circuits (11-14) are connected in series to sequentially delay a digitized first luminance signal for an image by a prescribed amount, and generate second through fifth luminance signals for an image respectively. First through fourth subtractors (21-24) generate first through fourth subtracted signals by subtracting first through fourth luminance signals from second through a fifth luminance signals respectively. First through fourth absolute value circuits (31-34) calculate absolute values from first through fourth subtracted signals. First through fourth comparators (41-44) generate first through fourth noise reduced compared signals by comparing a given reference signal with outputs from the first through the fourth absolute value circuits (31-34).

A first gate (51) generates a second control signal by logically multiplying an inverse signal of the first compared signal by the second compared signal. A second gate (52) generates a first control signal by logically multiplying an inverse signal of the fourth compared signal by the third compared signal. A data selector (60) selectively outputs any one of the second through the fourth luminance signals for an image by taking the first and the second control signals as selective signals after inputting the third luminance signal to the first and the fourth input terminals, the second luminance signal to the second input terminal, and the fourth luminance signal to the third input terminal.

Therefore, by correcting a edge of the image luminance signal according to the above described invention, correction time at level-variation region of the image luminance signal is reduced. In other words, a edge portion of the luminance signal becomes less in duration because the data selector (60) outputs the third luminance signal when the first and the second control signals are "00" or "11", outputs the second luminance signal when the first and the second control signals are "01", and outputs the fourth luminance signal when the first and the second control signals are "10".

FIG. 6 is a waveforms diagram of each of the signals occurrence in the FIG. 5 circuit, wherein:

Waveforms "6A-6E" are the first through the fifth luminance signals;

Waveforms "6F-6I" are the first through the fourth compared signals;

Waveforms "6J-6K" are the first and the second control signals; and

Figure 6A:
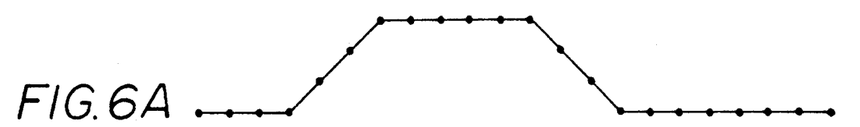
FIG. 6 is a waveform diagram of the signals occurring in the FIG. 5 circuit.
Figure 6B:
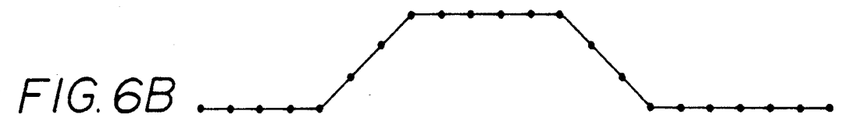
Figure 6C:
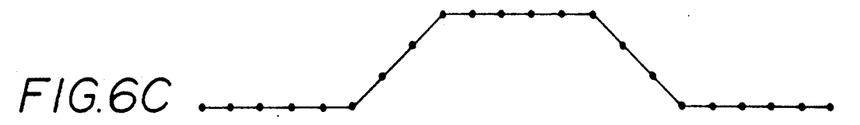
Figure 6D:
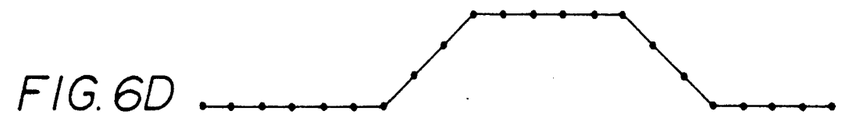
Figure 6E:
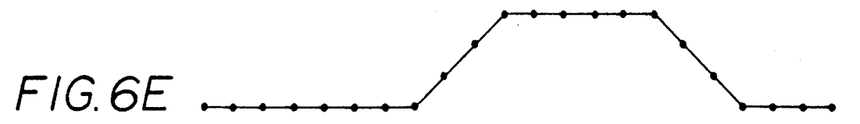
Figure 6F:
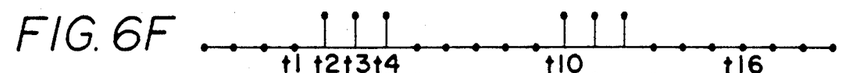
Figure 6G:
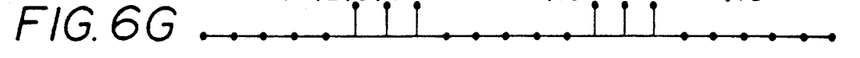
Figure 6H:
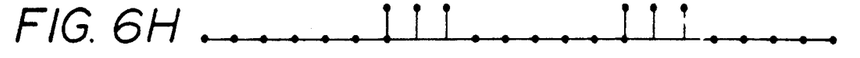
Figure 6I:
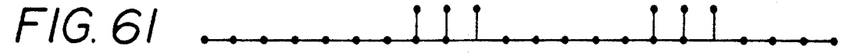
Figure 6J:
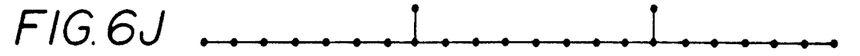
Figure 6K:
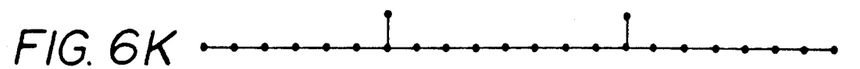
Figure 6L:
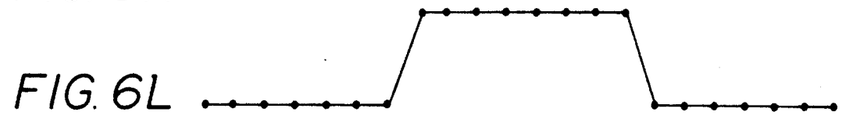

Waveform "6L" is the final corrected luminance signal which is outputted from the data selector (60) according to the first and the second control signals.

Figure 7:
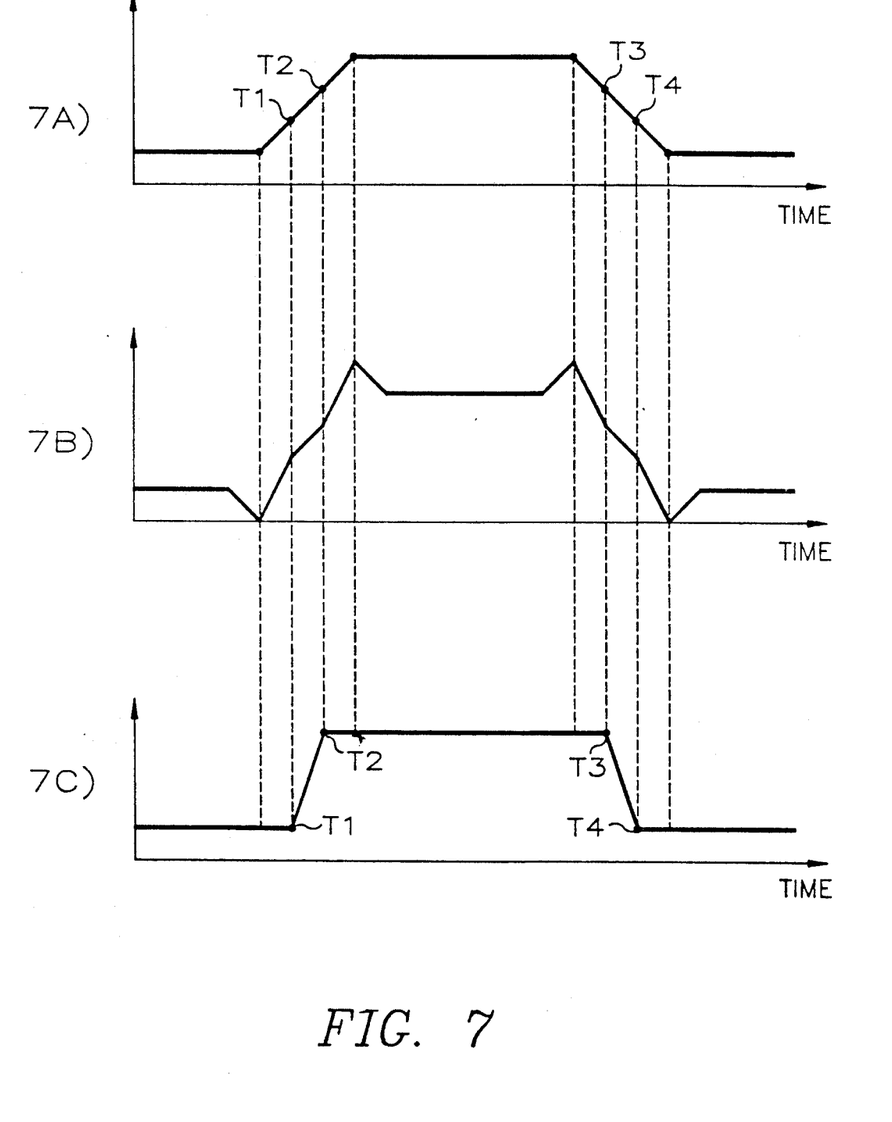
FIG. 7 is a comparative diagram of waveforms in edge correction.

FIG. 7 is a comparative diagram of waveforms from an edge correcting circuit of prior art and of edge correcting circuit of the present invention.

The present invention is now described in more detail, based on the constitution with a reference to FIGS. 5, 6. and 7.

When the digitized luminance signal "6A" is input into the first through the fourth delay circuits (11-14) in series, the second through the fifth luminance signals which are delayed by the delay circuit are generated as shown in "6B-6E". The first through the fourth delay circuits (11-14) can consist of D flip-flops, and the delay time of the delay circuit is one sampling clock cycle delaying the luminance signal. Thus, the first through the fifth luminance signals are the luminance signals which are delayed by one sampling period interval. In an actual digital signal processing circuit, a sampled quantized step value is held for one sampling clock period, but is shown as a dot in FIG. 6 for an ease of explanation. Therefore, the dot in FIG. 6 means a sampled luminance signal.

The first through the fourth luminance signals as in "6A-6D" and the second through the fifth luminance signals as in "6B-6E" are applied to the first through the fourth subtractors (21-24) respectively. The first through the fourth subtractors subtract one signal from the other, resulting in a zero, positive value, or negative value. If the result is not zero, it means that the level of the luminance signal is changing. Therefore, the first subtractor (21) outputs a non-zero positive data at "t2", "t3", and "t4" of FIG. 6. Also, the first subtractor (21) outputs non-zero negative data at "t10", "t11", and "t12" of FIG. 6. The outputs from the first through the fourth subtractors at "t1-t16" of FIG. 6 can be shown as in table 1.

TABLE 1

|  | RESULT | |
|---|---|---|
|  | POSITIVE | NEGATIVE |
| FIRST SUBTRACTOR | t2-t4 | t10-t12 |
| SECOND SUBTRACTOR | t3-t5 | t11-t13 |
| THIRD SUBTRACTOR | t4-t6 | t12-t14 |
| FOURTH SUBTRACTOR | t5-t7 | t13-t15 |

As shown in table 1, the first through the fourth subtractors (21-24) output either a positive or a negative value where the level of luminance signal changes. The outputs from the first through the fourth subtractors (21-24) are applied to the first through the fourth absolute value circuits (31-34) respectively and became same valued positive numbers regardless of their signs. Thus, the negative data from the first through the fourth subtractors (21-24) are converted to positive data, by passing through the first through the fourth absolute value circuits (31-34). The outputs from the first through the fourth absolute value circuits (31-34) are applied to the first through the fourth comparators (41-44) for a comparison with an applied reference signal. When the output signal from the absolute value circuits (31-34) is greater than the reference signal, a logical high signal("1") as in (6F-6I) is generated. The reason for a comparison between the reference signal and the signals from the first through the fourth subtractors at the first through the fourth comparators (41-44) is to prevent a malfunction by removing noise using the reference signal because there can be a difference between two of the same luminance signals applied to the subtractor due to noise in an actual luminance signal.

Therefore, the first through the fourth comparators prevent a malfunction due to noise in the luminance signal, and generate a logical high signal ("1") when a difference in the delayed signal is higher than the given reference level, that is, when the level of the luminance signal is changing with time. Also, when a difference in the delayed signal is lower than the given reference level, that is, when the level of the luminance signal is not changing with time, a logical zero signal ("0") is generated. Therefore, when the first luminance signal as in "6A" which stays in a black level for a specific period and then changes to a white level which changes back to the black level after the specific period enters and is delayed by one sampling period interval at the first through the fourth delay circuits (11-14) as in "6B-6E", the first and the fourth compared signals as in "6F-6I" are generated only during a transitional period where the level of the luminance signal is changing.

At the first gate (51), the second compared signal and the inverse signal of the first compared signal are logically multiplied to generate the second control signal "6J". At the second gate (52), the third compared signal and the inverse signal of the fourth compared signal are logically multiplied to generate the first control signal "6K". Thus, the first control signal becomes the logical signal "1" when the level of a base signal stops changing as at time "t4" and "t12". Otherwise, the first control signal stays a logical zero. Also, the second control signal becomes the logical "1" signal just before a stable state, as at times "t5" and "t13", of the third luminance signal. Otherwise, the second control signal stays a logical zero. Therefore, the first and the second control signals are "00" when the third luminance signal "6C" is the first and second luminance signals before delay and the fourth and fifth luminance signals after delay that are not changed and will not be changed in compared value. The first and the second control signals become "10" where the third luminance signal starts to change its level from the stable state and becomes "01" just before the third luminance signal starts to stabilize from a changing state.

The first and the second control signals, which change as stated above, are applied to the data selector (60) as a selection control signal. The data selector (60) takes the third luminance signal as an input to the first and the fourth input terminals, the second luminance signal as an input to the second input terminal, and the fourth luminance signal as an input to the third input terminal. Therefore, the data selector (60) outputs by selecting the third luminance signal when the first and the second control signals are "00" or "11", outputs by selecting the fourth luminance signal when the control signals are "10" as in "t4" and "t12", and outputs by selecting the second luminance signal when the control signals are "01" as in "t5" and "t13". Therefore, a final luminance signal from the data selector "60" becomes the edge corrected signal which requires less conversion time where the level of the luminance signal changes, as shown "6L" of FIG. 6.

As shown in FIG. 7, the edge correction is achieved by reducing the conversion time and detecting a starting point and an ending point of a edge region in a signal, that is by outputting data just before a change as in "7C" where the luminance signal "7A" starts to change as in "T1" and "T3", and outputting data from a stabilized point where the point just before the stabilization from a changing state starts as in "T2" and "T4". Thus, as shown in "7B", it is possible to display the luminance signal vividly by reducing the time to change levels as in "7C" without changing an amplitude of a signal level during the edge correction.

In addition, if the components in FIG. 5 are connected in multiple steps series, a certain edge correction can be achieved even though the time for the luminance signal level change is increased.

As stated above, by applying the edge correcting circuit in a digital image processor, a sharp edge of an image can be effectively generated regardless of a contrast in a pixel of a boundary region by reducing the conversion time of a signal level in the edge of the image.

Although specific constructions and procedures of the invention have been illustrated and described herein, it is not intended that the invention be limited to the elements, the constructions and the method disclosed. One skilled in the art will easily recognize that the particular elements, subconstructions and similar methods may be used without departing from the scope and spirit of the invention.

What is claimed is:

1. An edge correcting circuit which generates a edge correction signal by reducing the conversion time of a signal level at a edge region of a luminance signal said circuit comprising:
   a first control signal generator which generates a first control signal by detecting a pixel where said luminance signal starts to change;
   a second control signal generator which generates a second control signal by detecting a pixel prior to a stabilization of said luminance signal from a change;
   wherein said second control signal generator comprises:
   a first delay circuit and a second delay circuit which are in serial connection and generate a second luminance signal and a third luminance signal each delayed a predetermined time;
   a first subtractor and a second subtractor which generate a first difference signal and a second difference signal by subtracting said second luminance signal and said third luminance signal from said luminance signal and said second luminance signal, respectively;
   a first absolute value circuit and a second absolute value circuit which generate a first absolute value signal and a second absolute value signal in response to said first difference signal and said second difference signal, respectively;
   a first comparator and a second comparator which generate a first comparator signal and a second comparator signal by comparing said first absolute value signal and said second absolute value signal to a reference signal, respectively, to reduce noise; and
   a first gate which generates said second control signal when a level of said third luminance signal changes to a stable state signal level from an unstable state signal level by logically multiplying an inverse of said first comparator signal by said second comparator signal.

2. An edge correction circuit as claimed in claim 1, wherein said first control signal generator comprises:
   a third delay circuit and a fourth delay circuit which are in serial connection and generate a fourth luminance signal and a fifth luminance signal by delaying said third luminance signal from said second control signal generator;
   a third subtractor and a fourth subtractor which generate a third difference signal and a fourth difference signal by subtracting said fourth luminance signal and said fifth luminance signal from said third luminance signal and said fourth luminance signal, respectively;
   a third absolute value circuit and a fourth absolute value circuit for generating a third absolute value signal and a fourth absolute value signal from said third difference signal and said fourth difference signal, respectively;
   a third comparator and a fourth comparator which reduce noise by comparing said third absolute value signal and said fourth absolute value signal with a given reference signal to generate a third comparator signal and a fourth comparator signal, respectively; and
   a second gate which generates said first control signal at a point when a level of said third luminance signal starts to change by multiplying logically an inverse of said fourth comparator signal and said third comparator signal.

3. A edge compensation circuit as claimed in claim 2, wherein:
   a data selector inputs said third luminance signal to a second and a third input terminal, said second luminance signal to a first input terminal, and said fourth luminance signal to a fourth input terminal, outputs selectively said fourth luminance signal just after a level of said third luminance signal changes and outputs selectively said second luminance signal just before said third luminance signal stabilizes.

4. A signal edge correcting circuit including:
a means for receiving an incoming signal;
a data selector;
first, second, third and fourth serial delay means for producing substantially equal serial delays of said incoming signal, said incoming signal being connected to the input of said first delay means, said first delay means outputting a first delayed signal to said second delay means, said second delay means outputting a second delayed signal to said third delay means, said third delay means outputting a third delayed signal to said fourth delay means, and said fourth delay means outputting a fourth delayed signal to said data selector, said first, second, and third delay means also outputting said first, second, and third delayed signals to said data selector;
first, second, third, and fourth means for determining, respectively, the absolute values of first, second, third, and fourth differences between the incoming signal and the first delayed signal, the first delayed signal and the second delayed signal, the second delayed signal and the third delayed signal, and the third delayed signal and the fourth delayed signal;
first, second, third, and fourth means for comparing, respectively, said first, second, third, and fourth absolute value differences with a given reference signal;
means for developing a first control signal from said first and second comparing means and a second control signal from said third and fourth comparing means; and
means to apply said first and second control signals to said data selector to selectively output the inputted delayed signals.

5. The signal edge correcting circuit of claim 4 wherein said signal is a digitized representation of an analog signal.

6. The signal edge correcting circuit of claim 4 wherein each of said serial delay means is a D flip-flop.

7. The signal edge correcting circuit of claim 6 wherein the delay time of each flip-flop is one sampling clock cycle.

8. The signal edge correcting circuit of claim 4 wherein each of said four means for determining the absolute value of said differences includes a subtractor circuit and an absolute value circuit.

9. A method for enhancing edge regions of a video image signal by reducing transition zones, said method comprising:
receiving said video image signal and detecting transition zone beginnings by comparing each pixel to a first preceding pixel immediately preceding said pixel and comparing said first preceding sample pixel to a second preceding pixel immediately preceding said first preceding pixel;
and detecting transition zone ends by comparing each pixel to a first subsequent pixel immediately following each pixel and comparing said first subsequent pixel to a second subsequent pixel immediately following said first subsequent pixel; and
regenerating said video image signal having corrected edge regions by setting each pixel to said first subsequent pixel when one of said transition zone ends is detected and by setting each pixel to said first preceding pixel when one of said transition zone beginnings is detected.

10. A signal processing circuit for enhancing signal transition, said signal processing circuit comprising:
first delay means for delaying a first signal to generate a second signal;
second delay means for delaying said second signal to generate a third signal;
third delay means for delaying said third signal to generate a fourth signal;
fourth delay means for delaying said fourth signal to generate a fifth signal;
data selector means for selectively outputting one of a plurality of signals in response to a selection signal, said plurality of signals comprising said second signal, said third signal, and said fourth signal;
first magnitude difference means for calculating a magnitude of a difference between said first signal and said second signal and generating a first magnitude difference signal;
second magnitude difference means for calculating a magnitude of a difference between said second signal and said third signal and generating a second magnitude difference signal;
third magnitude difference means for calculating a magnitude of a difference between said third signal and said fourth signal and generating a third magnitude difference signal;
fourth magnitude difference means for calculating a magnitude of a difference between said fourth signal and said fifth signal and generating a fourth magnitude difference signal;
selector signal means for generating said selection signal in response to said first magnitude difference signal, said second magnitude difference signal, said third magnitude difference signal, and said fourth magnitude difference signal.

11. The signal processing circuit, as claimed in claim 10, wherein each said first magnitude difference signal, said second magnitude difference signal, said third magnitude difference signal, and said fourth magnitude difference signal are compared to a reference signal before becoming an input to the selector signal means.

12. The signal processing circuit, as claimed in claim 10, wherein said selection signal comprises a first bit and a second bit, and said selector signal means comprises:
a first AND gate generating said second bit in response to said second magnitude difference signal and an inverse of said first magnitude difference signal; and
a second AND gate generating said first bit in response to said third magnitude difference signal and an inverse of said fourth magnitude difference signal.

* * * * *

UNITED STATES PATENT AND TRADEMARK OFFICE
CERTIFICATE OF CORRECTION

PATENT NO. : 5,151,787
DATED : September 29, 1992
INVENTOR(S) : Young Jun Park

It is certified that error appears in the above-indentified patent and that said Letters Patent is hereby corrected as shown below:

Column 7, Claim 9, line 56, delete "sample".

Signed and Sealed this

Second Day of November, 1993

Attest:

BRUCE LEHMAN

Attesting Officer     Commissioner of Patents and Trademarks